Nov. 1, 1966

H. B. SCHALLER 3,282,042

CRYSTAL CONTROLLED CHRONOMETER

Filed Sept. 10, 1964

2 Sheets-Sheet 1

INVENTOR.
HANS B. SCHALLER
BY
Michael Ebert
ATTORNEY

Nov. 1, 1966

H. B. SCHALLER 3,282,042

CRYSTAL CONTROLLED CHRONOMETER

Filed Sept. 10, 1964

2 Sheets-Sheet 2

INVENTOR.
HANS B. SCHALLER
BY Michael Ebert
ATTORNEY

3,282,042
CRYSTAL CONTROLLED CHRONOMETER

Hans B. Schaller, Bienne, Switzerland, assignor to Bulova Watch Company, New York, N.Y., a corporation of New York Filed Sept. 10, 1964, Ser. No. 395,424
6 Claims. (Cl. 58—23)

Figure 1:
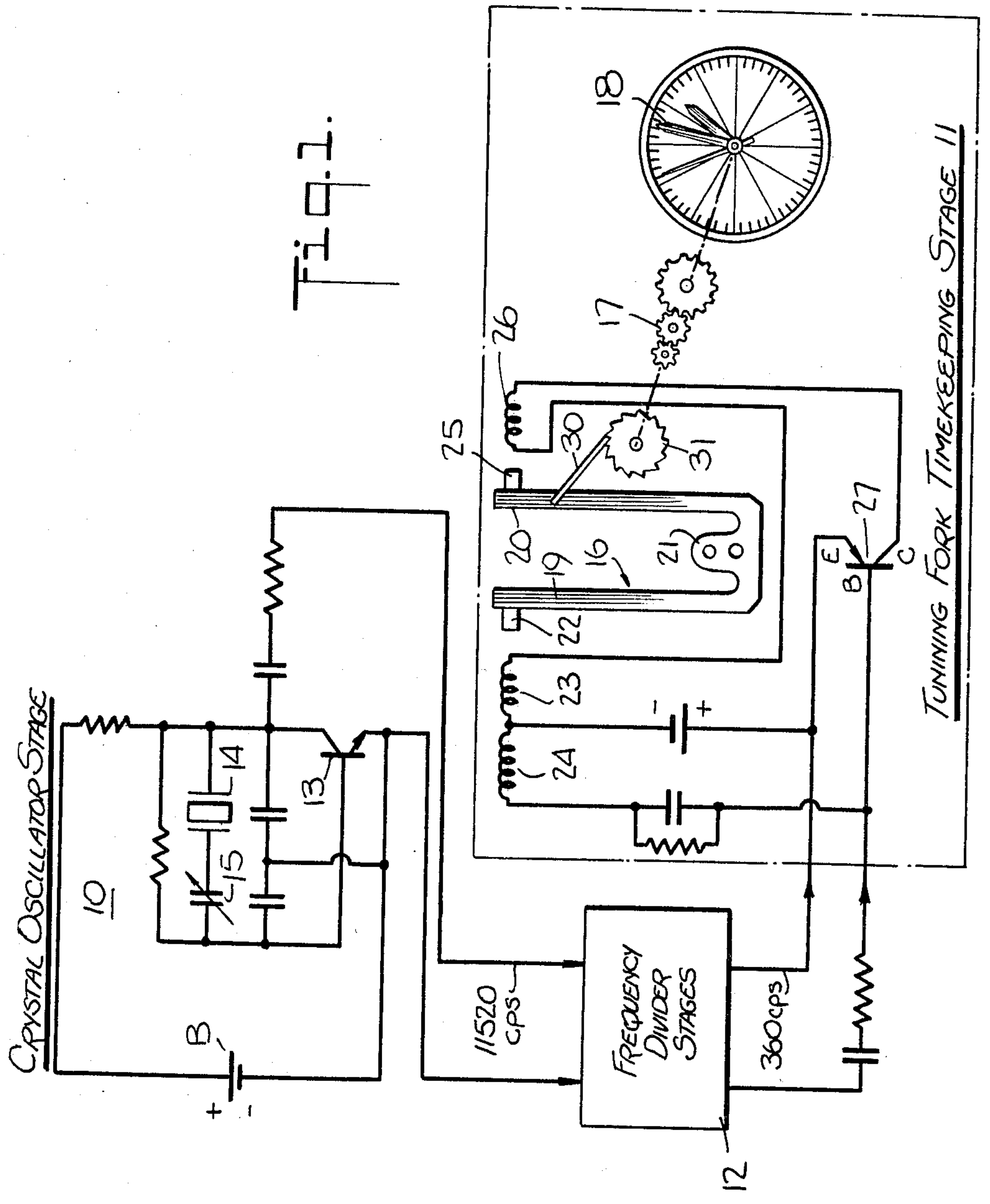

This invention relates generally to chronometers, and more particularly to a battery-operated portable chronometer of exceptionally small size which incorporates a quartz-crystal oscillator acting to synchronize an electronically-actuated tuning fork timepiece.

A chronometer is an instrument for precision time measurement, usually taking the form of a spring-actuated mechanical timepiece suspended in gimbals and poised to remain horizontal at all times. In recent years, with a view to avoiding the mechanical limitations inherent in chronometers of conventional design, attempts have been made to use quartz-crystal oscillators as timekeeping standards of high precision.

The resonant frequency of a quartz-crystal oscillator depends on the dimensions of the crystal slab and the relationship between the geometry of the slab and the geometry of the crystal structure. The frequency of such resonators is therefore restricted by the practical limitations of slab size. In practice, the lowest operating frequency of crystal oscillators lies in the range of several kilocycles. Consequently, to display time, using a synchronous motor it is necessary to divide the resonator frequency of the crystal oscillator to a much lower value. This ordinarily involves the use of a chain of divider stages constituted by binary, flip-flop or multivibrator circuits.

In one known form of crystal-controlled clock, the frequency of a crystal oscillator is 10,000 cycles per second, this frequency being divided to 50 cycles per second to provide power for energizing a synchronous motor. Such small motors have poor efficiency in the order of 1% or less, hence the power consumption of the system is relatively high. When, therefore, the clock is battery-operated, because of this heavy power consumption, the battery life is quickly exhausted.

In the case of electro-mechanical clocks synchronized by quartz-crystal oscillators, it is necessary to divide the frequency down to as low as 2 cycles per second. This necessitates a long chain of divider stages to divide down from several thousand cycles (i.e. 10,000 c.p.s.) to two or three cycles per second. Moreover, the power requirement of such clocks is also quite high.

In view of the foregoing, it is the principal object of this invention to provide a battery-operated quartz-crystal controlled chronometer which is highly efficient and precise in operation, and is of exceptionally small size. A chronometer in accordance with the invention is not position-sensitive and it is not necessary to provide means to maintain the instrument in a horizontal position.

More specifically, it is an object of the invention to provide a miniaturized quartz-crystal controlled chronometer in which the crystal oscillator acts to synchronize a tuning-fork electronic timepiece, both the oscillator and the timepiece being energized by small battery cells which, because of the efficiency of the system, maintain the chronometer in operation for a prolonged period.

Also an object of the invention is to provide a chronometer of the above type incorporating a tuning fork having a relatively high frequency which requires fewer divider stages to reduce crystal oscillator frequency to the appropriate pulse repetition rate for synchronizing the tuning-fork timepiece.

A significant advantage of the invention resides in the fact that the tuning-fork timepiece is a self-sufficient and highly accurate timekeeper, hence even if the source of synchronizing pulses fails momentarily, the device will continue to provide satisfactory readings.

By synchronizing the tuning-fork timepiece with pulses having the same repetition rate and derived by division from a temperature-stabilized crystal-controlled oscillator, it becomes possible to attain a chronometer precision of 0.01 second per day or better. Because of the efficiency of the system, when using mercury batteries to operate the crystal oscillator, divider stages, and the tuning-fork timepiece, the total power consumption lies in the microwatt region, thereby making it possible to energize the system for more than a year before it is necessary to replace the batteries.

Figure 2:
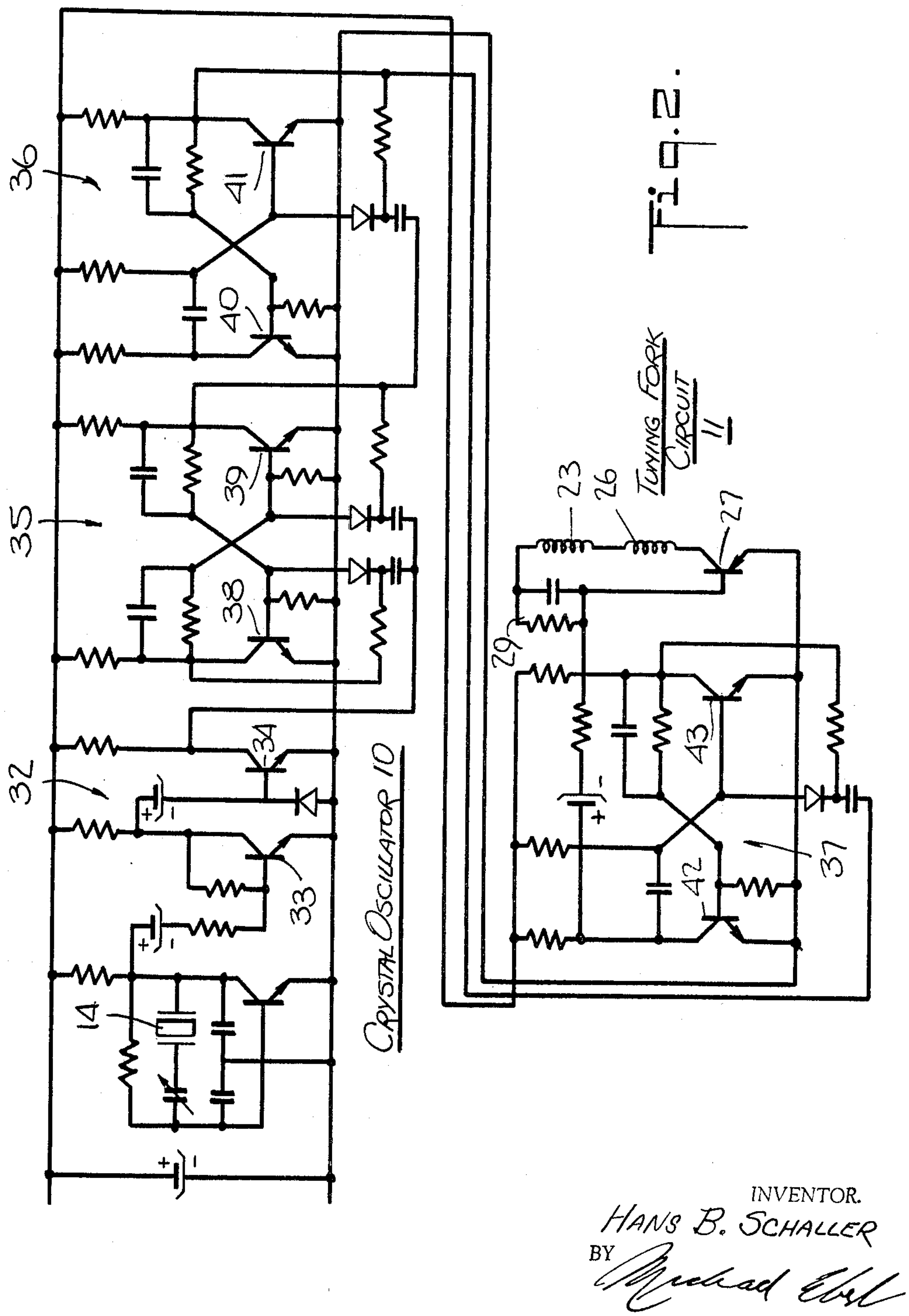

For a better understanding of the invention, as well as other objects and further features of the invention, reference is made to the following detailed description of the invention, to be read in conjunction with the accompanying drawing, wherein:

FIGURE 1 schematically shows a crystal-controlled chronometer in accordance with the invention, and FIGURE 2 is a detailed circuit diagram of the chronometer.

Referring now to the drawing and more particularly to FIG. 1, the chronometer in accordance with the invention is constituted by a crystal oscillator stage 10 operating at a relatively high frequency in the kilocycle range, an electronically-actuated tuning fork timepiece stage 11 having a tuning fork whose natural frequency is at least 200 cycles per second, and frequency divider stages 12 coupled to the oscillator stage 10 to provide pulses having the same repetition rate as the tuning fork to synchronize the operation of the timepiece.

The crystal-controlled oscillator may be of any known transistorized type, such as those employing the circuits described in the text, "Transistor Electronics" (1955) published by Prentice-Hall, Inc. In the circuit shown in the figure, the oscillator includes a transistor 13 and a piezoelectric crystal element 14 in a suitable holder. The oscillator is energized by a small mercury cell B such as one having a voltage of 2.7 volts. This same battery may be used to energize the divider stages.

The oscillator operates at a frequency of 8640 cycles per second or 11,520 c.p.s. Either frequency is given by way of example only, and it will be understood that in practice any relatively low crystal frequency may be used, provided that the oscillator is highly stable.

The frequency of a crystal-controlled oscillator is constant provided that the oscillator operates at even temperature. To reduce the sensitivity of the oscillator to temperature variations, one may employ a crystal element which is cut to have a zero temperature coefficient. Thermal compensation may be effected also by the use of thermostatically-controlled heating chambers, but since such chambers require power to operate they are not feasible under conditions where power consumption must be minimized. However, when the crystal oscillator is at a master station for synchronizing a multiplicity of tuning-fork timekeepers, a controlled chamber may be in order.

Other known techniques compensating for changes in ambient temperature without increasing the power requirement of the oscillator are by means of compensating networks including bi-metallic capacitors, such as capacitor 15, temperature-responsive diodes or inductors, which act to shift the phase of the crystal circuit as a function of temperature to correct for changes therein. In practice, such networks attain a compensation of at least $10^{-6}$ in the temperature range of 4° C. to 36° C.

It will be appreciated that the ultimate precision of the chronometer depends on the stability of the crystal oscillator, and for extremely high orders of precision, the oscillator frequency must be independent of temperature changes. However, even when temperature compensation is not fully effective, the system still fulfills chronometric requirements and is superior to mechanical chronometers.

We shall assume, by way of a preferred example, that the frequency of the tuning fork in the timepiece is 360 cycles per second, for this is the actual frequency of the commercially available ACCUTRON movement. But in practice, lower or higher tuning-fork frequencies may be used. There is no need with a chronometer of the type disclosed herein, to suspend the device in gimbals or to provide other poising means to maintain an absolutely horizontal position.

With an oscillator frequency of 8640 cycles per second and a fork frequently of 360 c.p.s., the frequently of the oscillator must be divided by 24, whereas for an oscillator frequency of 11,520 c.p.s., the division must be by a factor of 32. Frequency division can be carried out in various ways by well known techniques. Thus, by applying the high-frequency wave from the oscillator to synchronize an astable or monostable multivibrator, the timing waveform of the multivibrator can be locked to some submultiple of the higher frequency.

Phase-shift oscillators may also be used as frequency dividers, as decribed in the text (Section 16–55) "Radio-Engineering Handbook," McGraw-Hill Book Company (1959). Binary flip-flop circuits may also be employed for this purpose, wherein for each two input pulses, one output pulse is generated, thereby dividing by 2.

Thus, assuming a crystal frequency of 11,520 c.p.s., the divider stages may take the form of a flip-flop circuit dividing the input frequency in half to 5760 c.p.s., followed by a first monostable multivibrator dividing this value by 4 to 1440 c.p.s., followed by a second monostable multivibrator dividing 1440 c.p.s. by 4 to produce 360 c.p.s., with a twenty-five per cent duty cycle. A short duty cycle is of advantage in synchronizing an electronically-actuated tuning fork of the type disclosed herein. However, monostable multivibrators have timing capacitors which must be individually adjusted, and this raises a minor practical difficulty.

Another approach is to use instead of multivibrators, a chain of bistable flip-flop circuits, each dividing by 2. Such circuits require no adjustment, but on the other hand, they have a fifty per cent duty cycle and also require more components. In this instance, with an initial frequency of 11,520 c.p.s., with a series of five flip-flop dividers, the frequency can be reduced to 360 c.p.s.

The tuning fork timekeeping stage is of the type disclosed in Hetzel Patent 2,971,323 and includes a self-sufficient timekeeping standard formed by a tuning fork 16 having a predetermined natural frequency and a battery-energized transistorized drive circuit to sustain the vibratory motion of the fork. This motion is transferred to a rotary movement including the usual gear train 17 and dial pointers 18 turned thereby.

Tuning fork 16 is provided with a pair of flexible tines 19 and 20 interconnected by a relatively inflexible base 21, the base being provided with an upwardly extending stem **21*a* secured to the pillar plate by suitable screws. The tuning fork is actuated by means of a first transducer constituted by a magnetic element coacting with a drive coil section 23 and a phase sensing coil 24. A second transducer is provided, constituted by a magnetic element 25 secured to the free end of tine 20 and coacting with a drive coil section 26**.

The electronic drive circuit comprises a transistor 27, a single-cell battery 28 and a resistance-capacitance bias network 29. Transistor 27, which may be of the germanium PNP type, is provided with base, emitter and collector electrodes, designated B, E and C, respectively.

Base B is coupled through the bias network 29 to one end of phase-sensing coil 24, the other end of which is connected to one end of drive coil section 23. The main drive coil section 26 is connected in series with section 23 to collector C. Emitter E is connected to the positive terminal of battery 28, the negative terminal of which is connected to the junction of coils 23 and 24. Battery 28 is of the constant voltage type, such as a mercury cell providing a constant voltage (i.e., 1.3. volts) for almost the full duration of its useable life.

The interaction of the electronic drive circuit and the tuning fork is self-regulating and functions not only to cause the tines to oscillate at their natural frequency, but also to maintain these oscillations at a substantially constant amplitude. Attached to tine 20 is a pawl 30 which engages a ratchet wheel 31, whereby the vibratory motion of the pawl is converted into rotary motion for driving the gear train 17.

In operation, a pulse applied to the drive coils of the transducers will cause an axial thrust on the associated magnetic element in a direction determined by the polarity of the pulse in relation to the polarization of the permanent magnet to an extent depending on the energy of the pulse. Since the magnetic elements are attached to the tines, the thrust thereon acts mechanically to excite the fork into vibration.

The resultant movement of the magnetic elements relative to the fixed coils induces a black E.M.F. in the drive coils and in the phase sensing coils, which back E.M.F. takes the form of an alternating voltage whose frequency corresponds to the fork frequency. The voltage pickup by the phase sensing coil is applied to the base of the transistor to control the instant during each cycle when the driving pulse is to be delivered to the drive coil. The behavior of this circuit is more fully explained in the Hetzel patent referred to above.

The tuning-fork timekeeping stage 11 is a self-sufficient device of high accuracy. It is rendered even more precise by applying synchronizing pulses from the divider stages 12 to the base-emitter circuit of the transistor, as shown, or elsewhere in the circuit, to cause the oscillations of the tuning-fork circuit to lock in with the synchronizing pulses. Since the synchronizing pulses are derived from a crystal-controlled source and have a repetition rate which is more stable than that of the tuning fork, by bringing the tuning fork in step with these pulses, the frequency of the fork is governed by the more stable source. Thus where the fork timekeeper is ordinarily accurate to within a few seconds per day, by subjecting it to the control of the crystal oscillator its precision is improved to a point where it is accurate to a small fraction of a second per day, thereby attaining the highest chronometric standards.

Inasmuch as the tuning-fork timepiece movement is available commercially in watch sizes and will operate for at least a year on a single cell, even with the additional components required in adding a crystal oscillator and divider stages, the resultant instrument is still miniature and portable, despite its high precision. It will also be appreciated that a common or master crystal oscillator and divider stage assembly may be used to synchronize a large number of tuning-fork timepieces located at various positions remote from the master control.

Referring now to FIG. 2, an actual embodiment of the invention is shown in which the output of crystal oscillator 10 is fed to a flip-flop stage 32 constituted by a pair of transistors 33 and 34, followed by three multivibrator stages 35, 36 and 37, each including a pair of transistors 38–39, 40–41, 42–43, respectively. The output of the multivibrator 37 is applied to the electronic circuit of the tuning fork circuit 11, the operation of the system being as described in connection with FIG. 1.

While there has been shown a preferred embodiment of crystal controlled chronometer in accordance with the invention, it will be appreciated that many changes and modifications may be made therein without, however, departing from the essential spirit of the invention as defined in the annexed claims.

What I claim is:

1. A chronometer comprising: an electronically-actuated tuning-fork timekeeper having a tuning fork whose natural frequency exceeds 300 cycles per second, an electronic circuit to maintain said fork in vibration at its natural frequency and with substantially constant amplitude, said circuit including a battery to supply power thereto and means to convert the vibratory motion of the fork into rotary motion to operate the indicators of the timekeeper, said timekeeper being accurate to within a few seconds a day, and frequency oscillator means having a stability exceeding that of said timekeeper and including a crystal-controlled generator operating at a frequency in the kilocycle range whose lower limit is 3000 kilocycles which is a multiple of the fork frequency in conjunction with a divider to apply periodic pulses which are a sub-multiple of the crystal frequency to said electronic circuit to synchronize the operation thereof whereby the precision of said timekeeper is governed by said oscillator means to an accuracy within a fraction of a second a day, said oscillator means being powered by a direct-current source independent of said battery, whereby upon failure of said oscillator means said timekeeper continues to function with a high degree of accuracy.

2. A chronometer as set forth in claim 1, wherein said fork frequency is 360 cycles per second and said oscillator frequency is in the range of 8 to 12 kilocycles.

3. A chronometer as set forth in claim 1, wherein said divider is constituted by a chain of bistable flip-flop circuits.

4. A chronometer as set forth in claim 1, wherein said divider includes at least one multivibrator stage which produces output pulses which are a sub-multiple of the applied input frequency.

5. A chronometer as set forth in claim 1, wherein said oscillator is temperature-compensated.

6. A chronometer as set forth in claim 1, wherein said oscillator and divider act as a master control to synchronize a plurality of timekeepers.

References Cited by the Examiner

UNITED STATES PATENTS

| | | | |
|---|---|---|---|
| 1,560,056 | 11/1956 | Horton | 324—80 |
| 2,814,769 | 11/1957 | Williams | 318—171 |
| 2,976,470 | 3/1961 | Krassoievitch et al. | 318—341 |
| 2,988,868 | 6/1961 | Lavet et al. | 58—23 |
| 3,063,233 | 11/1962 | Bly | 58—26 |
| 3,171,991 | 3/1965 | Baumer | 310—21 |
| 3,212,252 | 10/1965 | Nakai | 58—23 |

FOREIGN PATENTS

| | | |
|---|---|---|
| 691,848 | 6/1940 | Germany. |

RICHARD B. WILKINSON, *Primary Examiner.*

LEO SMILOW, LOUIS J. CAPOZI, *Examiners.*

G. F. BAKER, *Assistant Examiner.*